United States Patent
Glatz (10) Patent No.: US 7,672,688 B2
(45) Date of Patent: Mar. 2, 2010

(54) RADIO COMMUNICATION EQUIPMENT AND METHOD USED IN SAID EQUIPMENT

(75) Inventor: Andreas Glatz, Torna Hällestad (SE)

(73) Assignee: Sony Ericsson Mobile Communications AB, Lund (SE)

( * ) Notice: Subject to any disclaimer, the term of this patent is extended or adjusted under 35 U.S.C. 154(b) by 348 days.

(21) Appl. No.: 11/571,680

(22) PCT Filed: Jul. 8, 2005

(86) PCT No.: PCT/EP2005/007402

§ 371 (c)(1),
(2), (4) Date: Jun. 7, 2007

(87) PCT Pub. No.: WO2006/005532

PCT Pub. Date: Jan. 19, 2006

(65) Prior Publication Data

US 2007/0281628 A1 Dec. 6, 2007

(30) Foreign Application Priority Data

Jul. 8, 2004 (EP) .................................. 04016135

(51) Int. Cl.
H04B 1/44 (2006.01)
H04B 1/06 (2006.01)
H04B 7/00 (2006.01)

(52) U.S. Cl. ...................... 455/550.1; 455/78; 455/101; 455/132; 455/272; 455/553.1

(58) Field of Classification Search ............. 455/78–83, 455/552.1–553.1, 101, 103, 132–140, 272–277.1
See application file for complete search history.

(56) References Cited

U.S. PATENT DOCUMENTS 6,560,443 B1 * 5/2003 Vaisanen et al. .............. 455/73

(Continued)

OTHER PUBLICATIONS

International Preliminary Report on Patentability, including the Written Opinion of the International Searching Authority, for corresponding Application No. PCT/EP2005/007402.
International Search Report for corresponding Application No. PCT/EP2005/007402 mailed Oct. 5, 2005.

*Primary Examiner*—Simon D Nguyen
(74) *Attorney, Agent, or Firm*—Renner, Otto, Boisselle & Sklar, LLP (57) ABSTRACT

The present invention relates to a radio communication equipment comprising a first antenna 1, a first RF unit 2 for wireless communication, the first RF unit 2 being connectable to said first antenna 1, wherein a first frequency band is used by said first RF unit 2 for reception of a signal via said first antenna 1 and a second frequency band is used by said first RF unit 2 for transmission of a signal via said first antenna 1, said first and second frequency bands being used alternatively by said first RF unit 2 and a second RF unit 3 for wireless communication, the second RF unit 3 being connectable to said first antenna 1, wherein a third frequency band is used by said second RF unit 3 for reception of a signal and a fourth frequency band 3T is used by said second RF unit 3 for transmission of a signal, said third and fourth frequency bands being used simultaneously by said second RF unit 3. According to the present invention the radio communication equipment 0 further comprises a second antenna 4, wherein said second RF unit 3 is simultaneously connectable to both the first antenna 1 and the second antenna 4 and reception of a signal is performed by said second RF unit 3 via either the first or second antenna 1, 4 and transmission of a signal is performed by said second RF unit via the other antenna 1, 4.

15 Claims, 3 Drawing Sheets

U.S. PATENT DOCUMENTS

| | | |
|---|---|---|
| 7,142,824 B2 * | 11/2006 | Kojima et al. ................. 455/78 |
| 7,239,889 B2 * | 7/2007 | Saari et al. ............... 455/552.1 |
| 7,412,255 B2 * | 8/2008 | Klemetti et al. .......... 455/553.1 |
| 2003/0119547 A1 | 6/2003 | Leyh et al. |
| 2003/0193923 A1 | 10/2003 | Abdelgany et al. |
| 2003/0203743 A1 * | 10/2003 | Sugar et al. .............. 455/550.1 |
| 2004/0005913 A1 | 1/2004 | Bollenbeck |

* cited by examiner

RADIO COMMUNICATION EQUIPMENT AND METHOD USED IN SAID EQUIPMENT

TECHNICAL FIELD OF THE INVENTION

The present invention relates to a radio communication equipment and a method used in said radio communication equipment comprising the features of the preambles of independent claims 1 and 14, respectively.

In the technical field of radio communication equipment such as mobile telephones, pagers, communicators, electronic organizers, smartphones or the like, wireless communication has been broadly established.

To allow both transmission and reception of a signal in real time or quasi real time, usually a receiving frequency band and a transmitting frequency band are used by conventional communication standards for radio communication equipment. Said transmitting frequency band and said transmitting frequency band of each communication standard are separated by a certain distance in the frequency direction to allow a reliable distinction of the transmitting and receiving frequency band.

In the recent years the ability of radio communication equipment to communicate according to more than one communication standard has been increased due to the different communication standards throughout the world. Thus, modern radio communication equipment are adapted to communicate via plural transmission frequency bands and plural corresponding receiving frequency bands.

DESCRIPTION OF RELATED ART

In the following, a mobile phone according to the prior art is explained in more detail by reference to FIGS. 4 and 5.

Figure 4:
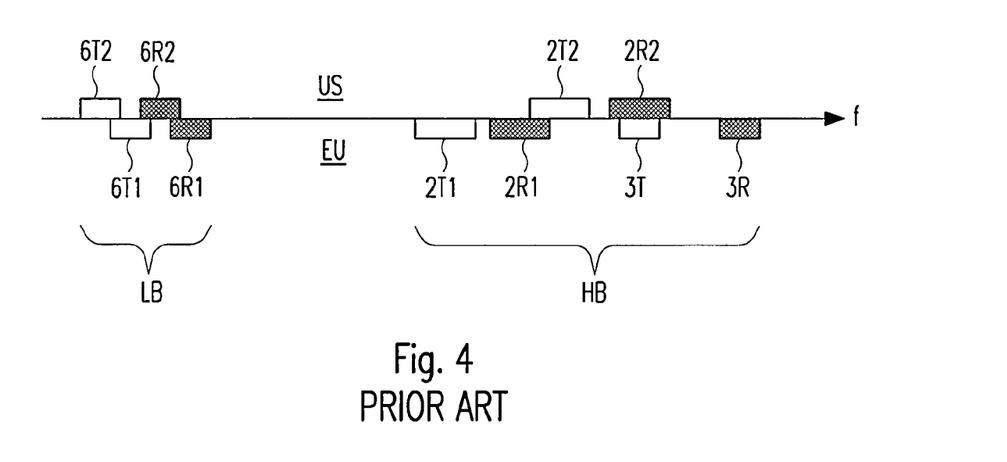
FIG. 4 explains the frequency bands conventionally used for wireless communication.

As it is shown in FIG. 4, different standards for wireless communication via a mobile phone have been established in the United States US and the European Union EU. In the United States US, according to the GSM 850 standard low band LB wireless communication is possible by using a receiving frequency band 6R2 being in the order of 869 to 894 MHz and a transmitting frequency band 6T2 being in the order of 824 to 849 MHz. Furthermore, a high band AB communication standard (GSM 1900) has been established in the US by using a receiving frequency band 2R2 being in the order of 1930 to 1990 MHz and a transmitting frequency band 2T2 being in the order of 1850 to 1910 MHz.

In the European Union EU a low band communication standard (GSM 900) has been established that uses a receiving frequency band 6R1 being in the order of 925 to 960 MHz and a transmitting frequency band being in the order of 880 to 915 MHz. Furthermore, in the EU two high band communication standards have been established. A first communication standard called GSM 1800 uses a receiving frequency band 2R1 being in the order of 1805 to 1880 MHz and a transmitting frequency band 2T1 being in the order of 1710 to 1785 MHz. The second high band communication standard so far established in the EU is called Wide Band Code-Divisional Multiple Access W-CDMA or UMTS standard and uses a receiving frequency band 3R in the order of 2110 to 2170 MHz and a transmitting frequency band 3T being in the order of 1920 to 1980 MHz.

It is obvious that other standards already might be used in other parts of the world or might be established in the future.

Modern mobile phones usually are adapted to be used with at least two or three of the above cited communication standards. Due to the significant distance (in frequency direction) between the low band and high band communication standards and the overlapping frequency bands of the standards used in the United States US and the European Union, it is obvious that the provision of a mobile phone that is capable to deal with plural communication standards is a challenge for the design of the mobile phone. Especially the design of the antenna used in a respective mobile phone is difficult since an antenna usually has to be designed/optimized for a certain frequency range.

A corresponding mobile phone according to the prior art is explained in more detail by reference to FIG. 5.

Figure 5:
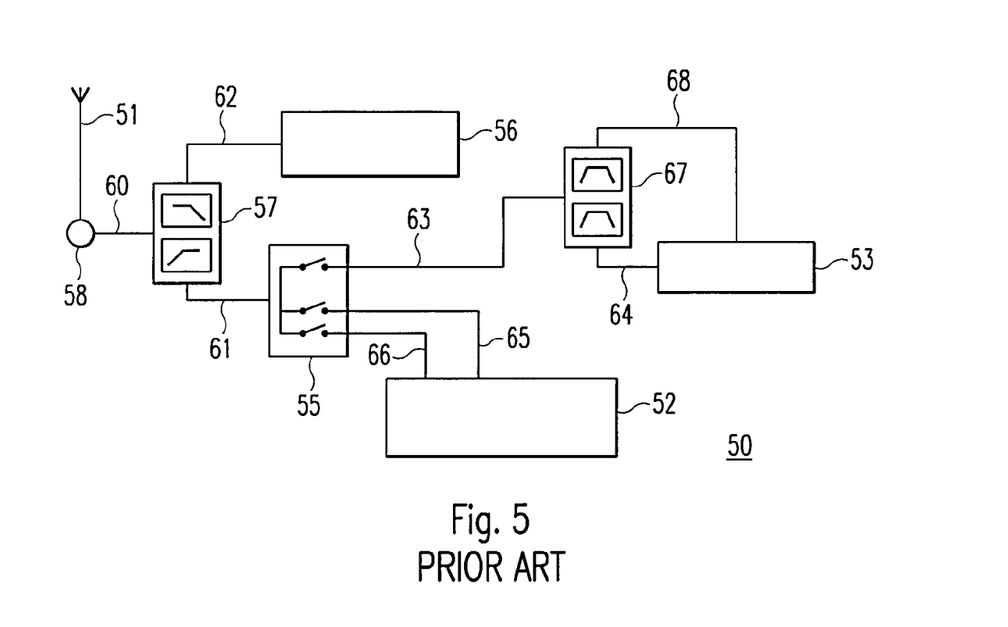
FIG. 5 shows a block diagram of a radio communication equipment according to the prior art.

The mobile phone 50, the essential parts of which are shown in FIG. 5, is capable to communicate via several communication standards comprises an antenna 51, a first RF unit 52 that is provided for the GSM 1800 and/or GSM 1900 standard, a second RF unit 53 that is provided for the WCDMA standard and a third RF unit 56 that is provided for the GSM 850 and/or GSM 900 standard.

The antenna 51 is connected to a band-pass filter 57 via a signal line 60.

The band-pass filter 57 determines whether a signal received from the antenna 51 via the signal line 60 belongs to a low band LB communication standard or a high band HB communication standard. A signal belonging to a low band communication standard is transmitted by the band-pass filter 57 via a signal transmission line 62 to the third RF unit 56. A signal belonging to a high band communication standard is transmitted by the band-pass filter 57 via a signal transmission line 61 to a switch 55.

The switch 55 guarantees that either a receiver or a transmitter of the first RF unit 52 or a duplexer 67 is connected to the antenna 51 via the band-pass filter 57 by corresponding signal lines 63, 65, 66. Thus, the signal transmitted to the receiver of the first RF unit 52 via signal line 66 belongs to the receiving frequency range 2R1 and the signal transmitted to the transmitter of the first RF unit 52 via signal line 65 belongs to the transmitting frequency range 2T1. The signal transmitted to the duplexer 67 via signal line 63 comprises both a signal belonging to the receiving frequency range 3R and the transmitting frequency range 3T.

The duplexer 67 is adapted to simultaneously transmit and receive a signal from the antenna 1 via the bandpass filer 57 and the switch 55 and the signal line 63 and to separate the transmitting frequency range 3T and the receiving frequency range 3R comprised in the signal. In the present case, the duplexer 67 transmits the receiving frequency range 3R via signal line 68 to the second RF unit 53 and the transmitting frequency range 3T via signal line 69 to the second RF unit 53. Furthermore, the mobile phone 50 according to the prior art comprises a connector 58 provided at a feed point of the antenna 51. Said connector 58 is adapted to connect the mobile phone 50 to an external antenna and to disconnect the mobile phone 50 from the internal antenna 51 in case an external antenna is attached to the mobile phone 50 via said connector 58.

Replacement of the internal antenna 51 by an external antenna via the connector 58 is especially useful if the mobile phone 50 is used in a car and the external antenna is provided outside the car body. The reason is that strong RF source in the car might cause disturbances in the electronics of the car. Furthermore, reception and transmission of an RF signal by the mobile phone 50 might be disturbed due to the body of the car.

The structure of the above described mobile phone according to the prior art results in plural drawbacks.

A first drawback is that the design of the antenna is very complicated since all frequency bands supported by the mobile phone have to be provided to the antenna 51 via one single feed point. Otherwise, the provision of a connector for an external antenna would not be possible. If the bands are closed in frequency this is particularly difficult and causes degraded performance of both the antenna gain and isolation. Moreover, the performance of the antenna is degraded in all bands due to the high number of the supported bands.

It is a second drawback that a separate duplexer necessarily has to be provided since the transmission frequency band and the receiving frequency band are continuously provided via one single signal line to the second UF unit. This duplexer is a very bulky and expensive component that further causes a high loss of typically 2 decibel in the signal path.

It is a third drawback that a further loss of about 1.5 decibel is caused by the switch due to the large frequency band supported by the switch. Furthermore, the linearity of the switch has to be quite high in order to prevent mixing products at the receiving frequencies.

OBJECT OF THE PRESENT INVENTION

It is the object of the present invention to overcome the above cited disadvantages of the prior art and to provide a radio communication equipment that has a simple structure and can be manufactured with lower costs due to the usage of relatively cheap components. A further object to provide a radio communication equipment that avoids losses in the signal paths.

It is a further object of the present invention to provide a method of controlling said radio communication equipment in an easy and reliable way.

DESCRIPTION OF THE INVENTION

The above object is solved in a radio communication equipment comprising the features of the preamble of independent claim 1 by the features of the characterising part of claim 1.

Furthermore, the above object is solved with a method for controlling a radio communication equipment comprising the features of the preamble of independent claim 14 by the features of the characterising part of claim 14.

Further developments are set forth in the dependent claims.

The above object is solved by a radio communication equipment comprising a first antenna, a first RF unit for wireless communication, the first RF unit being connectable to said first antenna, wherein a first frequency band is used by said first RF unit for reception of a signal via said first antenna and a second frequency band is used by said first RF unit for transmission of a signal via said first antenna, said first and second frequency bands being used alternatively by said first RF unit and a second RF unit for wireless communication, the second RF unit being connectable to said first antenna, wherein a third frequency band is used by said second RF unit for reception of a signal and a fourth frequency band is used by said second RF unit for transmission of a signal, said third and fourth frequency bands being used simultaneously by said second RF unit. According to the present invention the radio communication equipment further comprises a second antenna, wherein said second RF unit is simultaneously connectable to both the first antenna and the second antenna and reception of a signal is performed by said second RF unit via either the first or second antenna and transmission of a signal is performed by said second RF unit via the other antenna.

Since the second RF unit of the inventive radio communication equipment is simultaneously connected to both the first antenna and the second antenna wherein one antenna is used for the reception of a signal/receiving path and the other is used for the transmission of a signal/transmitting path, no duplexer has to be provided. Therefore, any loss in the frequency path caused by the duplexer is avoided. Furthermore, the high costs caused by the provision of a duplexer are avoided. Moreover, the first antenna has to be adapted to either the third frequency band used by said second RF unit for reception of a signal or the fourth frequency band used by said second RF unit for transmission of a signal, only in consequence, the first antenna has to support a reduced number of frequency bands which might result in a lower frequency range and thus can be adapted in a better way.

According to a preferred embodiment the radio communication equipment further comprises a switch for connecting the first antenna to a first receiver of said first RF unit or to a first transmitter of said first RF unit or to a second receiver of said second RF unit or to a second transmitter of said second RF unit, respectively, wherein said second receiver of said second RF unit simultaneously is connected to said second antenna if said first antenna is connected by said switch to said second transmitter of said second RF unit and said second transmitter of said second RF unit simultaneously is connected to said second antenna if said first antenna is connected by said switch to said second receiver of said second RF unit.

By the provision of a switch the first antenna selectively can be connected with either the first RF unit or the second RF unit in an easy way. Since either the third frequency band used for reception of a signal or the fourth frequency band used for transmission of a signal by the second RF unit has to be connected by the switch with the first antenna a loss in the signal path caused by the switch is limited to either the third frequency band or the fourth frequency band.

Preferably, said second receiver of said second RF unit permanently is connected to said second antenna and said second transmitter of said second RF unit selectively is connectable to said first antenna by said switch.

In this case, the linearity requirement of the switch can be reduced since the WCDMA transmit and receipt signals are not present in the same signal path and thus do not disturb each other by inter-modulation products. Possibly the frequency range is decreased, too.

It is beneficial if said first receiver of said first RF unit is adapted to use at least two different first frequency bands for reception of a signal via said first antenna and said first transmitter of said first RF unit is adapted to use at least two different second frequency bands for transmission of a signal via said first antenna.

Favourably, the first frequency band used by said first RF unit for reception of a signal is between 1930-1990 MHz and the second frequency band used by said first RF unit for transmission of a signal is between 1850-1910 MHz and additionally or alternatively the first frequency band used by said first RF unit for reception of a signal is between 1805-1880 MHz and the second frequency band used by said first RF unit for transmission of a signal is between 1710-1785 MHz.

Thus, the first RF unit preferably is adapted for wireless communication according to the GSM 1800 and/or the GSM 1900 standard.

It is preferred that the third frequency band used by said second RF unit for reception of a signal is between 2110-2170 MHz and the fourth frequency band used by said second RF unit for transmission of a signal is between 1920-1980 MHz.

In consequence, the second RF unit preferably is adapted to the WCDMA (Wideband Code-Division Multiple-Access) and/or the UMTS (Universal Mobile Telecommunication Standard) standard.

According to a preferred embodiment of the present invention the portable radio communication equipment further comprises a third RF unit for wireless communication, the third RF unit being connectable to said first antenna, wherein a fifth frequency band is used by said third RF unit for reception of a signal via said first antenna and a sixth frequency band is used by said third RF unit for transmission of a signal via said first antenna, said fifth and sixth frequency bands being used alternatively by said third RF unit.

In consequence, the inventive radio communication equipment may be used for wireless communication according to a communication standard using a frequency range that is significantly different from the frequency range used by the first and second RF units.

In this case it is preferred that the radio communication equipment further comprises a band-pass filter connected to said first antenna, wherein said band-pass filter automatically transmits a signal belonging to a predefined frequency range to said third RE unit and automatically transmits a signal belonging to a frequency range of a frequency higher than said predefined frequency range to said first and second RF units via said switch, respectively.

By the provision of a band pass filter low band signals received from the first antenna can be separated from high band signals in a reliable, easy and cheap way.

Preferably the third RF unit is adapted to use at least two different fifth frequency bands for reception of a signal via said first antenna and the third RF unit is adapted to use at least two different sixth frequency bands or transmission of a signal via said first antenna.

Favourably, the fifth frequency band used by said third RF unit for reception of a signal is between 869-894 MHz and the sixth frequency band used by said third RF unit for transmission of a signal is between 824-849 MHz and additionally or alternatively the fifth frequency band used by said third RF unit for reception of a signal is between 925-960 MHz and the sixth frequency band used by said third RF unit for transmission of a signal is between 880-915 MHz.

In consequence, the third RF unit preferably is adapted for wireless communication according to the GSM 850 and/or the GSM 900 standard.

It is beneficial if the radio communication equipment further comprises a first connector to connect a first external antenna to the radio communication equipment, said first external antenna being adapted to replace said first antenna.

In consequence, all transmitted signals can be routed through an external antenna so that interference is less likely.

It is further preferred that the radio communication equipment further comprises a second connector to connect a second external antenna to the radio communication equipment, said second external antenna being adapted to replace said second antenna.

By the provision of a separate external antenna for the second antenna a reliable transmission and reception of a signal via the second antenna can be guaranteed even in a delicate environment.

According to an embodiment the first RF unit and/or the third RF unit are controlled according to the GSM global system for mobile communication standard and/or the DCS digital communication system standard and the second RF unit is controlled according to the WCDMA wideband code-division multiple-access standard.

Since the inventive radio communication equipment provides a high flexibility with respect to the standard used for wireless communication it is favourable if the radio communication equipment is a portable equipment.

Preferably, the radio communication equipment is a mobile phone.

Furthermore, the above object is solved by a method of controlling a radio communication equipment, the radio communication equipment comprising a first antenna, a first RF unit for wireless communication, a second RF unit for wireless communication and a second antenna, the method comprising the following steps: Identifying a communication standard selected by a user of said radio communication equipment or received via said first antenna or via said second antenna, respectively; Connecting said first RF unit to said first antenna and using a first frequency band for reception of a signal via said first antenna and a second frequency band for transmission of a signal via said first antenna wherein said first and second frequency bands are used alternatively by said first RF unit if a first communication standard is identified; and Connecting said second RF unit to said second antenna and using a third frequency band for receipt of a signal via said second antenna and connecting said second RF unit to said first antenna and using a fourth frequency band for transmission of a signal via said first antenna wherein said third and fourth frequency bands are used simultaneously by said second RF unit if a second communication standard is identified.

Furthermore, the above object is solved by a computer program product directly loadable into the internal memory of a radio communication equipment, comprising software code portions for performing the steps of claim 14 when said product is run on a microprocessor of said radio communication equipment.

BRIEF DESCRIPTION OF THE DRAWINGS

In the following detailed description, the present invention is explained by reference to the accompanying drawings, in which like reference characters refer to like parts throughout the views, wherein.

DETAILED DESCRIPTION OF PREFERRED EMBODIMENTS

Figure 1:
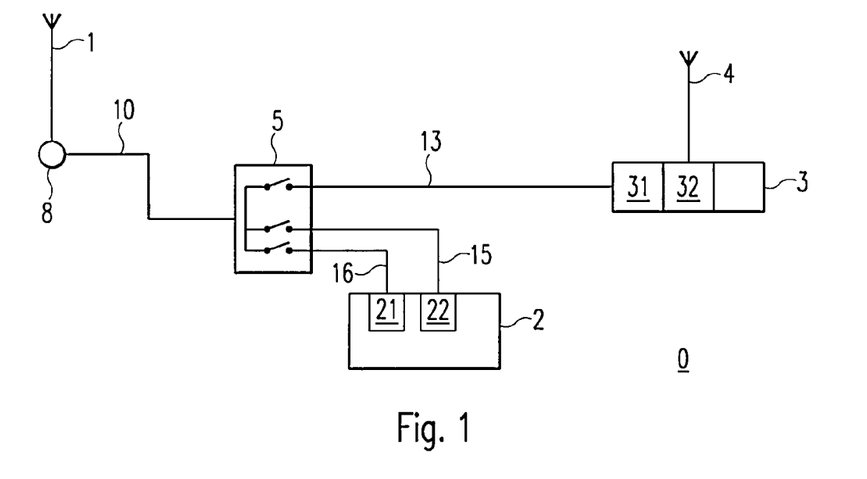
FIG. 1 shows a block diagram of a radio communication equipment according to the present invention.

FIG. 1 shows a block diagram of a first embodiment of a radio communication equipment according to the present invention.

In this embodiment the radio communication equipment is a mobile phone and thus a portable radio communication equipment. Alternatively, the radio communication equipment may be a pager, communicator, electronic organizer, smartphone or the like. It is emphasized that the Figures only show the parts that are necessary for the present invention. A plurality of other parts (e.g. microprocessors, batteries etc.) might be provided in the radio communication equipment.

The mobile phone 0 shown in FIG. 1 comprises a first internal antenna 1 that is connected by a first signal line 10 to a switch 5. In the present embodiment the first antenna 1 is a triple band antenna. Alternatively, it might be a dual-, quad- or n-band antenna (with n being at least 2).

The switch 5 is adapted to connect said first antenna 1 either to a first receiver 21 of a first RF unit for wireless communication via a second signal line 16 or to a first transmitter 22 of said first RF unit 2 via a third signal line 15 or to a second receiver 31 of a second RF unit 3 for wireless communication via a fourth signal line 13.

A second internal antenna 4 permanently is connected to a second transmitter 32 of said second RF unit 3.

In the present embodiment, the first RF unit 2 is controlled according to the GSM (Global System for Mobile Communication) standard, wherein a first frequency band 2R1 of between 1805 to 1880 MHz is used by said first RF unit for reception of a signal and a second frequency band of between 1710 to 1785 MHz is used by said first RF unit 2 for transmission of a signal via said first antenna 1. Said first and second frequency bands are used alternatively by said first RF unit 2 since either the first receiver 21 or the first transmitter 22 of the first RF unit 2 are connected to the first antenna 1 by said switch 5.

In the present embodiment, the second RF unit 3 is controlled according to the WCDMA (Wideband Code Division Multiple Access) or UMTS (Universal Mobile Telecommunication Standard) standard. Thus, a third frequency band 3R of between 2110 to 2170 MHz is used by said second RF unit 3 for reception of a signal. Simultaneously, a fourth frequency band 3T of between 1920 to 1980 MHz is used by said second RF unit 3 for transmission of a signal.

In this respect it is important to emphasize that the second RF unit 3 is adapted to use both the third and fourth frequency bands 3R, 3T simultaneously. In contrast, the first RF unit 2 is adapted to use the first and second frequency bands 2R1, 2T1 alternatively, only.

Since only the third frequency band 3R used for reception of a signal by the second RF unit 3 has to be connected by the switch 5 with the first antenna 1 a loss in the signal path caused by the switch is limited to the third frequency band 3R. Since the second transmitter 32 of said second RE unit 3 permanently is connected to said second internal antenna 4, the linearity requirement of the switch 5 is reduced since the WCDMA transmit and receipt signals are not present in the same signal path and thus do not disturb each other by intermodulation products.

A first connector 8 is provided in a feed point of the first antenna 1 to connect a first external antenna (not shown) to the mobile phone 0. In case an external antenna is connected via said first connector 8 to the mobile phone 0, the first internal antenna 1 is automatically deactivated by said first connector 8.

Figure 3:
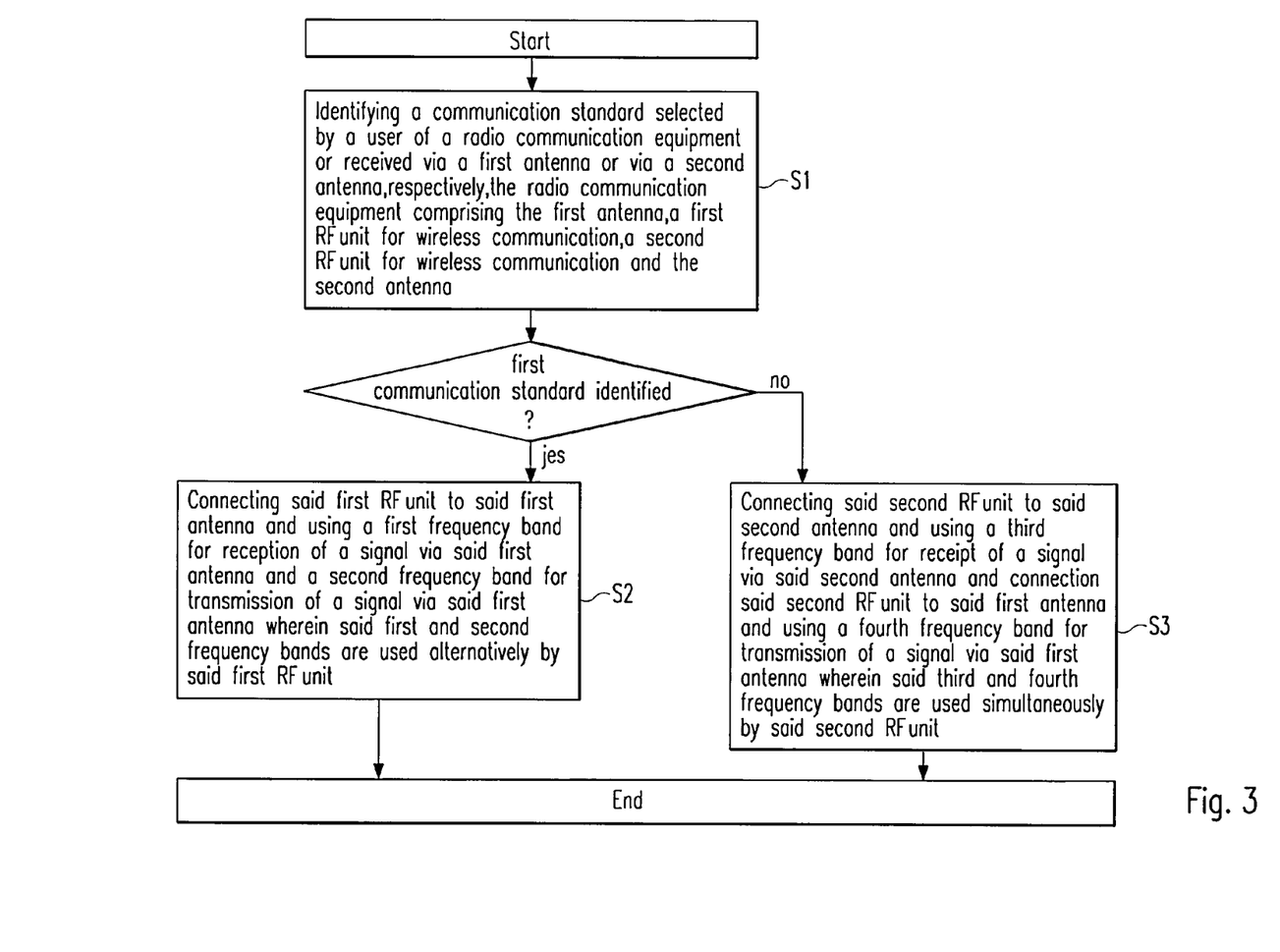
FIG. 3 shows the function of the inventive method for controlling the radio communication equipment of FIG. 1 based on a schematic diagram.

In the following, the inventive method for controlling the mobile phone 0 shown in FIG. 1 is further explained based on a schematic diagram shown in FIG. 3.

In a first step S1, a communication standard selected by a user of the mobile phone 0 or received via the first internal antenna 1 or via the second internal antenna 4 or via an external antenna automatically is identified by the switch 5.

In case a first communication standard (in the present example the GSM standard) is identified by the system, the method proceeds further with step S2.

In step S2, the first receiver 21 and first transmitter 22 of the first RF unit 2 alternatively are connected to the first antenna 1 by the switch 5 in line with the requirements of the detected first communication standard. Thus, alternating the first frequency band 2R1 for reception of a signal and the second frequency band 2T1 for transmission of a signal are used by said first RF unit 2 and the switch 5 is switched correspondingly.

In case the system identifies a communication standard different from first communication standard (e.g. the UMTS or WCDMA standard), the switch 5 automatically connects the second receiver 31 of the second RF unit 3 to said first antenna 1. Simultaneously, the second transmitter 32 of the second RF unit 3 is connected to the second internal antenna 4. Thus, the second RF unit 3 is adapted to simultaneously use said first frequency band 3R for reception of a signal via said first antenna 1 and said fourth frequency band 3T for transmission of a signal via said second antenna 4.

Since the second transmitter 32 of the second RF unit 3 permanently is attached to said second internal antenna 4 and the second receiver 31 of said second RF unit 3 is connectable to said first internal antenna 1 via said switch 5 no separate duplexer has to be provided. In consequence, a loss in signal strength caused by the provision of a duplexer in a signal path is avoided. Furthermore, the costs for the inventive mobile phone are reduced since provision of a duplexer is far more expensive than provision of an additional internal antenna. Moreover, a duplexer requires a considerable amount of additional energy, wherein no or nearly no additional energy is consumed by the additional antenna.

Moreover, it is easier to design the first internal antenna 1 since a less number of frequency bands has to be supported.

In the following, a second preferred embodiment of the present invention is explained by reference to FIG. 2. Like reference characters refer to like parts in FIGS. 1 and 2.

Figure 2:
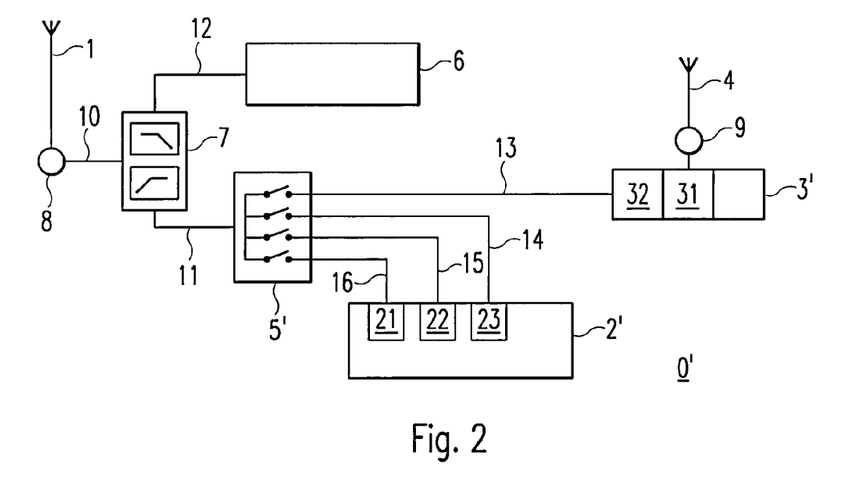
FIG. 2 shows a block diagram of a preferred embodiment of the radio communication equipment according to the present invention.

FIG. 2 shows a further embodiment of an inventive radio communication equipment, which could for example be and electronic organizer 0'.

In addition to the general differences between a mobile phone and an electronic organizer the electronic organizer 0' according to the second embodiment shown in FIG. 2 differs from the mobile phone 0 shown in the first embodiment essentially in that the first transmitter 22' of said first RF unit 2' is adapted to use at least two different second frequency bands 2T1, 2T2 for transmission of a signal via said first antenna 1. In the present embodiment, the first transmitter 22 of the first RF unit 2' is further adapted for transmission of a signal at the second frequency band 2T2 of between 1850 to 1910 MHz.

Furthermore, a third receiver 23 that is connectable to the first antenna 1 via said switch 5' is comprised in said first RF unit 2'. The first receiver 21 and the third receiver 23 of the first RF unit 2' are adapted to use different first frequency bands 2R1, 2R2 for reception of a signal via said first antenna 1. The first frequency band 2R2 used by said third receiver 23 of said first RF unit 2' for reception of a signal is between 1930 to 1990 MHz.

Thus, the first RF unit 2' of the electronic organizer 0' is adapted for wireless communication according to the GSM 1800 and/or the GSM 1900 standard.

The switch 5' is modified correspondingly to allow a selective connection of the first internal antenna 1 to the third receiver 23 of the first RF unit 2' via a fifth signal line 14.

Furthermore, according to the second embodiment the second receiver 31 of the second RF unit 2' permanently is connected to the second antenna 4 and the second transmitter 32 of said second RF unit 2' selectively is connectable to said first internal antenna 1 via said switch 5'.

In consequence, the linearity requirement of the switch 5' is reduced since the WCDMA transmit and receipt signals are not present in the same signal path and thus do not disturb each other by intermodulation products (the frequency band used by the second RF unit 2' for the transmission of a signal is lower in frequency direction than the frequency band used by the second RF unit 3' for reception of a signal).

A first connector 8 is provided in a feed point of the first antenna 1 to connect a first external antenna (not shown) to the mobile phone 0'. In case an external antenna is connected via said first connector 8 to the mobile phone 0', the first internal antenna 1 is automatically deactivated by said first connector 8. In consequence, all transmitted signals can be routed through an external antenna so that interference is less likely.

Furthermore, a second connector 9 is provided at a feed point to the second internal antenna 4 to connect a second external antenna (not shown) to the inventive electronic organizer 0'. In case a second external antenna is connected via the second connector 9 to the electronic organizer 0', the second internal antenna 4' automatically is deactivated by said second connector 9.

Moreover, according to the second embodiment shown in FIG. 2 a third RF unit 6 for wireless communication is provided.

Said third RF unit 6 is adapted for wireless communication according to the GSM 850 and/or the GSM 900 standard and thus for wireless communication at a frequency range that is lower in frequency direction than the frequency range used by the first and second RF units 2, 3.

In the present embodiment, the third RF unit 6 is connectable via a band pass filter 7 to feed point of the first antenna 1. Said band pass filter 7 is provided between a feed point of said first antenna 1 and the switch 5' and the third RF unit 6, respectively.

A fifth frequency band 6R1, 6R2 of about 869 to 894 MHz and/or 925 to 960 MHz is used by the third RF unit 6 for reception of a signal via said band pass filter 7 and said first antenna 1. A sixth frequency band 6T1, 6T2 of 824 to 849 MHz and/or 880 to 915 MHz is used by said third RF unit 6 for transmission signal via said band pass filter 7 and said first antenna 1. In consequence, the third RF unit 6 is adapted for wireless communication according to both the GSM 850 and/or GSM 900 standard.

Thus, the third RF unit 6 is adapted to use at least two different frequency bands 6R1, 6R2 for reception of signal via said first antenna 1 and to use at least two different frequency bands &T1, 6T2 for transmission of a signal via said first antenna 1.

According to the before mentioned standards, the fifth and sixth frequency bands are used alternatively by the third RF unit 6.

The band pass filter 7 automatically transmits a signal belonging to a predefined low frequency range LB to said third RF unit 6. Furthermore, said band pass filter 7 automatically transmits a signal belonging to a frequency range HB of a frequency higher than said predefined low frequency range LB to said first and second RF units 2', 3' via said switch 5'.

Although different elements for the first, second and third RF units are shown in the figures, it is obvious that plural RF units can be incorporated in one single electronic circuit. The same applies to the band pass filter and the switch.

It should be emphasized that the term "comprises/comprising" when used in this specification is taken to specify the presence of the features, integers, steps or components but does not preclude the presence or addition of one or more other features, integers, steps, components or groups thereof.

Furthermore, the above object is solved by a computer program product directly loadable into the internal memory of a radio communication equipment, comprising software code portions for performing the steps of claim 14 when said product is run on a microprocessor of said radio communication equipment.

The invention claimed is

1. A radio communication equipment comprising
a first antenna;
a first RF unit for wireless communication, the first RF unit being connectable to said first antenna, wherein a first frequency band is used by said first RF unit for reception of a signal via said first antenna and a second frequency band is used by said first RF unit for transmission of a signal via said first antenna, said first and second frequency bands being used alternatively by said first RF unit;
a second RF unit for wireless communication, the second RF unit being connectable to said first antenna, wherein a third frequency band is used by said second RF unit for reception of a signal and a fourth frequency band is used by said second RF unit for transmission of a signal, said third and fourth frequency bands being used simultaneously by said second RF unit;
a third RF unit for wireless communication, the third RF unit being connectable to said first antenna, wherein a fifth frequency band is used by said third RF unit for reception of a signal via said first antenna and a sixth frequency band is used by said third RF unit for transmission of a signal via said first antenna, said fifth and sixth frequency bands being used alternatively by said third RF unit;
a second antenna, said second RF unit being simultaneously connectable to both the first antenna and the second antenna and reception of a signal being performed by said second RF unit via either the first or second antenna and transmission of a signal being performed by said second RF unit via the other of the first and second antenna; and
a band-pass filter connected to said first antenna, said band-pass filter automatically transmitting a signal belonging to a predefined frequency range to said third RF unit and automatically transmitting a signal belonging to a frequency range of a frequency higher than said predefined frequency range to said first or second RF units.

2. A radio communication equipment according to claim 1, wherein the radio communication equipment further comprises
switch for connecting the first antenna to a first receiver of said first RF unit or to a first transmitter of said first RF unit or to a second receiver of said second RF unit or to a second transmitter of said second RF unit, respectively, wherein said second receiver of said second RF unit simultaneously is connected to said second antenna if said first antenna is connected by said switch to said second transmitter of said second RF unit and said second transmitter of said second RF unit simultaneously is connected to said second antenna if said first antenna is connected by said switch to said second receiver of said second RF unit.

3. A radio communication equipment according to claim 2, wherein said second receiver of said second RF unit permanently is connected to said second antenna and said second transmitter of said second RF unit-selectively is connectable to said first antenna by said switch.

4. A radio communication equipment according to claim 2, wherein said first receiver of said first RF unit is adapted to use at least two different first frequency bands for reception of a signal via said first antenna; and said first transmitter of said first RF unit is adapted to use at least two different second frequency bands for transmission of a signal via said first antenna.

5. A radio communication equipment according to claim 1, wherein the first frequency band used by said first RF unit for reception of a signal is between 1930-1990 MHz and the second frequency band used by said first RF unit for transmission of a signal is between 1850-1910 MHz or the first frequency band used by said first RF unit for reception of a signal is between 1805-1880 MHz and the second frequency band used by said first RF unit for transmission of a signal is between 1710-1785 MHz.

6. A radio communication equipment according to claim 1, wherein the third frequency band used by said second RF unit for reception of a signal is between 2110-2170 MHz and the fourth frequency band used by said second RF unit for transmission of a signal is between 1920-1980 MHz.

7. A radio communication equipment according to claim 1, wherein the third RF unit is adapted to use at least two different fifth frequency bands for reception of a signal via said first antenna; and the third RF unit is adapted to use at least two different sixth frequency bands for transmission of a signal via said first antenna.

8. A radio communication equipment according to claim 1, wherein the fifth frequency band used by said third RF unit for reception of a signal is between 869-894 MHz and the sixth frequency band used by said third RF unit for transmission of a signal is between 824-849 MHz or the fifth frequency band used by said third RF unit for reception of a signal is between 925-960 MHz and the sixth frequency band used by said third RF unit for transmission of a signal is between 880-915 MHz.

9. A radio communication equipment according to claim 1, wherein the radio communication equipment further comprises a first connector to connect a first external antenna to the radio communication equipment said first external antenna being adapted to replace said first antenna.

10. A radio communication equipment according to claim 1, wherein the radio communication equipment further comprises a second connector to connect a second external antenna to the radio communication equipment, said second external antenna being adapted to replace said second antenna.

11. A radio communication equipment according to claim 1, wherein the first RF unit and/or the third RF unit is controlled according to the GSM global system for mobile communication standard and/or the DCS digital communication system standard; and the second RF unit is controlled according to the WCDMA wideband code-division multiple-access standard.

12. A radio communication equipment according to claim 1 wherein the radio communication equipment is a portable equipment.

13. A radio communication equipment according to claim 1, wherein the radio communication equipment is a mobile phone.

14. A method of controlling a radio communication equipment, the radio communication equipment comprising
a first antenna;
a second antenna;
a first RF unit for wireless communication;
a second RF unit for wireless communication;
a third RF unit for wireless communication; and
a band-pass filter connected to said first antenna;
the method comprising the following steps:
(S1) identifying a communication standard selected by user of said radio communication equipment or received via said first antenna or via said second antenna;
(S2) connecting said first RF unit to said first antenna and using a first frequency band for reception of a signal via said first antenna and a second frequency band for transmission of a signal via said first antenna, wherein said first and second frequency bands are used alternatively by said first RF unit if a first communication standard is identified;
(S3) connecting said second RF unit to said second antenna and using a third frequency band for reception of a signal via said second antenna and connecting said second RF unit to said first antenna and using a fourth frequency band for transmission of a signal via said first antenna, wherein said third and fourth frequency bands are used simultaneously by said second RF unit if a second communication standard is identified; and
(S4) connecting said third RF unit and said first or second RF unit to said first antenna via said band-pass filter and using a fifth frequency band for reception of a signal via said first antenna and a sixth frequency band for transmission of a signal via said first antenna, wherein said fifth and sixth frequency bands are used alternatively by said third RF unit if a third communication standard is identified;
wherein said band-pass filter automatically transmits a signal belonging to a predefined frequency range to said third RF unit and automatically transmits a signal belonging to a frequency range of a frequency higher than said predefined frequency range to said first or second RF units.

15. A computer program product directly loadable into the internal memory of a radio communication equipment, comprising software code portions for performing the steps of claim 14 when said product is run on a microprocessor of said radio communication equipment.

* * * * *

UNITED STATES PATENT AND TRADEMARK OFFICE
CERTIFICATE OF CORRECTION

PATENT NO. : 7,672,688 B2  Page 1 of 1
APPLICATION NO. : 11/571680
DATED : March 2, 2010
INVENTOR(S) : Adreas Glatz It is certified that error appears in the above-identified patent and that said Letters Patent is hereby corrected as shown below:

Column 1, line 37, insert new paragraph at line 37 after "...European Union EU."

Column 1, line 42, replace "AB" with -- HB --.

Column 2, line 48, insert new paragraph before "Furthermore..."

Column 4, line 8, insert -- . -- after "only".

Column 5, line 19, replace "RE" with -- RF --.

Column 7, line 40, replace "RE" with -- RF --.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,672,688 B2  
APPLICATION NO. : 11/571680  
DATED : March 2, 2010  
INVENTOR(S) : Andreas Glatz Page 1 of 1

It is certified that error appears in the above-identified patent and that said Letters Patent is hereby corrected as shown below:

On the Title page  
Item (60), Related U.S. Application Data should be added:  
-- Related U.S. Application Data  
(60) Provisional Application No. 60/587,754, filed on July 14, 2004. --

Col. 1 lines 3-4,  
Specification, CROSS REFERENCE TO RELATED APPLICATION should be added immediately after the title:  
-- CROSS REFERENCE TO RELATED APPLICATION  
This application is a §371 of International Application No. PCT/EP2005/007402 filed on July 8, 2005, which claims benefit to U.S. Provisional Application No. 60/587,754 filed on July 14, 2004, and also claims priority to European Application No. 04016135.8 filed on July 8, 2004. --

Signed and Sealed this  
Fifteenth Day of November, 2011

David J. Kappos  
*Director of the United States Patent and Trademark Office*